(12) United States Patent
Koenig et al.

(10) Patent No.: US 9,049,883 B2
(45) Date of Patent: Jun. 9, 2015

(54) NUTRITIONAL COMPOSITIONS HAVING REDUCED SODIUM CONTENT AND METHODS FOR MAKING SAME

(75) Inventors: Elizabeth Ann-Clubbs Koenig, Rockford, MI (US); Jill Dean Wegner, Muskegon, MI (US); Karen Wink Barnes, Fremont, MI (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/008,345

(22) PCT Filed: Mar. 26, 2012

(86) PCT No.: PCT/US2012/030582
§ 371 (c)(1),
(2), (4) Date: Nov. 8, 2013

(87) PCT Pub. No.: WO2012/135126
PCT Pub. Date: Oct. 4, 2012

(65) Prior Publication Data
US 2014/0065259 A1 Mar. 6, 2014

Related U.S. Application Data

(60) Provisional application No. 61/469,060, filed on Mar. 29, 2011.

(51) Int. Cl.
*A23L 1/29* (2006.01)
*A23L 1/16* (2006.01)
*A23L 1/20* (2006.01)
*A23L 1/212* (2006.01)
(Continued)

(52) U.S. Cl.
CPC . *A23L 1/296* (2013.01); *A23L 1/16* (2013.01); *A23L 1/2001* (2013.01); *A23L 1/212* (2013.01); *A23L 1/237* (2013.01); *A23L 1/304* (2013.01)

(58) Field of Classification Search
CPC .............................. A23L 1/212; A23L 1/2375
USPC ......... 426/615, 801, 582, 646, 658, 518, 520, 426/649, 74, 73, 72
See application file for complete search history.

(56) References Cited

U.S. PATENT DOCUMENTS

2007/0292593 A1   12/2007   Ganesan
2009/0155408 A1    6/2009   Dupuy-Cornuaille et al.
2010/0291270 A1*  11/2010   Keller et al. ................. 426/244

OTHER PUBLICATIONS

Lopez, A., A Complete Course in Canning, 1981, The Canning Trade, Baltimore Maryland, 11th ed., pp. 432, 433.*

(Continued)

*Primary Examiner* — Helen F Heggestad
(74) *Attorney, Agent, or Firm* — Gary M. Lobel

(57) ABSTRACT

Nutritional compositions with targeted sodium levels for young children (e.g., ages 1-4 years) are provided. In a general embodiment, the present disclosure provides nutritional compositions having a targeted level of sodium, made from wholesome foods that provide macronutrients and micronutrients needed in a child's daily diet and are developmentally appropriate for this age group. The sodium levels of the nutritional compositions may be less than or equal to about 200 mg per 100 g nutritional composition. Methods of making nutritional compositions with targeted sodium levels while also achieving acceptable product flavors at both pilot and factory levels are also provided. The batching methods may include adding a slurry of ice, cold water and KCl to a batched product after an initial cooling step and before packaging.

11 Claims, 6 Drawing Sheets

(51) Int. Cl.
  *A23L 1/237* (2006.01)
  *A23L 1/304* (2006.01)

(56) References Cited

OTHER PUBLICATIONS

International Search Report and Written Opinion dated Jun. 12, 2012, filed in PCT Application No. PCT/US12/30582.
Anonymous, "Nutritional Supplement for Children," Feb. 2011.
Anonymous, "Probiotic Hydrolized Protein Formula," May 2006.
Anonymous, "Biscuit Flavored Milk & Cereal Drink," Sep. 2010.
Anonymous, "Toddler Nutrition Supplement," Apr. 2006.
Anonymous, "Beef Strips Stir-Fry with Vegetable," Apr. 2010.
Anonymous, "Italian Beef Caserole," Jan. 2009.
Anonymous, "THe Wiggles Cheese Flavour Ricey Bites," Jul. 2010.
Anonymous, "Mixed Grain with Mixed Fruit Infant Cereal," Aug. 2004.
Anonymous, "Cerelac Infant Cereal," Dec. 2001.

* cited by examiner

NUTRITIONAL COMPOSITIONS HAVING REDUCED SODIUM CONTENT AND METHODS FOR MAKING SAME

BACKGROUND

The present disclosure relates generally to health and nutrition. More specifically, the present disclosure relates to nutritional compositions having a targeted level of sodium for young children and methods of making and using the nutritional compositions. Methods for reducing the sodium content of nutritional compositions are also provided.

There are many types of nutritional compositions currently on the market. Nutritional compositions can be targeted toward certain populations or consumer groups, for example, young, elderly, athletic, etc., based on the specific foods and/or other ingredients in the nutritional composition. It is important to provide well-rounded and nutritious diets to growing young children (e.g., toddlers) to help them meet their daily micro- and macro-nutrient requirements, while limiting the intake of certain nutrients. However, taste and texture are extremely important in getting young children to consume nutritious foods. Indeed, administration of such nutritional compositions can be particularly problematic when the intended consumer is a child or toddler with selective eating habits.

One goal of nutritional support, therefore, is to provide young children with developmentally appropriate nutritional compositions that meet their taste requirements, while meeting targeted levels of sodium, and providing the macronutrients and micronutrients needed in a child's daily diet. Another goal of nutritional support is to provide manufacturing methods for producing nutritional compositions having the targeted amounts of sodium with acceptable flavor profiles.

SUMMARY

Nutritional compositions having targeted levels of sodium, and nutrition from wholesome food ingredients to help young children meet daily nutrient requirements in developmentally appropriate forms are provided. Methods of manufacturing nutritional compositions having reduced amounts of sodium but acceptable flavor profiles are also provided. In an embodiment, a nutritional composition formulated for a young child is provided. The nutritional composition includes sodium in an amount that is equal to or less than 200 mg per 100 kcal nutritional composition.

In another embodiment, a nutritional composition formulated for a young child is provided. The nutritional composition includes a source of potassium chloride and sodium, wherein the sodium in an amount that is equal to or less than 200 mg per 100 g of nutritional composition.

In an embodiment, the nutritional composition includes a food component selected from the group consisting of meat/beans, milk, cheese, yogurt, grains, pasta, fruit, vegetables, or combinations thereof.

In an embodiment, the nutritional composition is pre-packaged.

In an embodiment, the nutritional composition further includes a source of potassium chloride. The source of potassium chloride may be present in an amount from about 0.1% to about 1.0% by weight of the nutritional composition. In an embodiment, the source of potassium chloride may be present in an amount from about 0.2% to about 0.5%. In an embodiment, the source of potassium chloride may be present in an amount from about 0.3% to about 0.4%. The potassium chloride may be a ready-to-use mixture of potassium chloride and at least one flavorant. The flavorant may be a taste masking flavorant.

In an embodiment, the nutritional composition further includes a source of protein selected from the group consisting of dairy based proteins, plant based proteins, animal based proteins, artificial proteins, or combinations thereof. The dairy based proteins may be selected from the group consisting of casein, caseinates, casein hydrolysate, whey, whey hydrolysates, whey concentrates, whey isolates, milk protein concentrate, milk protein isolate, or combinations thereof. The plant based proteins may be selected from the group consisting of soy protein, pea protein, canola protein, wheat and fractionated wheat proteins, corn proteins, zein proteins, rice proteins, oat proteins, potato proteins, peanut proteins, green pea powder, green bean powder, spirulina, proteins derived from vegetables, beans, buckwheat, lentils, pulses, single cell proteins, or combinations thereof.

In an embodiment, the nutritional composition further includes a prebiotic selected from the group consisting of acacia gum, alpha glucan, arabinogalactans, beta glucan, dextrans, fructooligosaccharides, fucosyllactose, galactooligosaccharides, galactomannans, gentiooligosaccharides, glucooligosaccharides, guar gum, inulin, isomaltooligosaccharides, lactoneotetraose, lactosucrose, lactulose, levan, maltodextrins, milk oligosaccharides, partially hydrolyzed guar gum, pecticoligosaccharides, resistant starches, retrograded starch, sialooligosaccharides, sialyllactose, soyoligosaccharides, sugar alcohols, xylooligosaccharides, their hydrolysates, or combinations thereof.

In an embodiment, the nutritional composition further includes a probiotic selected from the group consisting of probiotics include *Aerococcus, Aspergillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or combinations thereof.

In an embodiment, the nutritional composition further includes an amino acid selected from the group consisting of alanine, arginine, asparagine, aspartate, citrulline, cysteine, glutamate, glutamine, glycine, histidine, hydroxyproline, hydroxyserine, hydroxytyrosine, hydroxylysine, isoleucine, leucine, lysine, methionine, phenylalanine, proline, serine, taurine, threonine, tryptophan, tyrosine, valine, or combinations thereof.

In an embodiment, the nutritional composition further includes a source of ω-3 fatty acids, the source selected from the group consisting of fish oil, krill, plant sources containing ω-3 fatty acids, flaxseed, walnut, algae, or combinations thereof. The ω-3 fatty acids may be selected from the group consisting of α-linolenic acid ("ALA"), docosahexaenoic acid ("DHA"), eicosapentaenoic acid ("EPA"), or combinations thereof.

In an embodiment, the nutritional composition further includes a phytonutrient selected from the group consisting of flavanoids, allied phenolic compounds, polyphenolic compounds, terpenoids, alkaloids, sulphur-containing compounds, or combinations thereof. The phytonutrient may further be selected from the group consisting of carotenoids, plant sterols, quercetin, curcumin, limonin, or combinations thereof.

In an embodiment, the nutritional composition further includes a nucleotide selected from the group consisting of a subunit of deoxyribonucleic acid, a subunit of ribonucleic acid, polymeric forms of DNA and RNA, or combinations thereof. The nucleotide may be an exogenous nucleotide.

In an embodiment, the nutritional composition further includes an antioxidant selected from the group consisting of astaxanthin, carotenoids, coenzyme Q10 ("CoQ10"), flavonoids, glutathione, Goji (wolfberry), hesperidin, lactowolfberry, lignan, lutein, lycopene, polyphenols, selenium, vitamin A, vitamin C, vitamin E, zeaxanthin, or combinations thereof.

In an embodiment, the nutritional composition further includes a vitamin, wherein the vitamin is selected from the group consisting of vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (folic acid), and Vitamin B12 (various cobalamins; commonly cyanocobalamin in vitamin supplements), vitamin C, vitamin D, vitamin E, vitamin K, K1 and K2 (i.e., MK-4, MK-7), folic acid, biotin, or combinations thereof.

In an embodiment, the nutritional composition further includes a mineral, wherein the mineral is selected from the group consisting of boron, calcium, chromium, copper, iodine, iron, magnesium, manganese, molybdenum, nickel, phosphorus, potassium, selenium, silicon, tin, vanadium, zinc, or combinations thereof.

In yet another embodiment, a method of reducing the dietary sodium intake of a young child is provided. The method includes, providing a nutritional composition formulated for a young child and having sodium in an amount that is equal to or less than 200 mg per 100 kcal nutritional composition, and administering the nutritional composition to the young child.

In an embodiment, the nutritional composition further includes a food component selected from the group consisting of meat/beans, milk, cheese, yogurt, grains, pasta, fruit, vegetables, or combinations thereof.

In an embodiment, the nutritional composition is a prepackaged nutritional composition.

In an embodiment, the nutritional composition further includes a source of potassium chloride. The source of potassium chloride may be present in an amount from about 0.1% to about 1.0% by weight of the nutritional composition, or 0.2% to about 0.5%, or 0.3% to about 0.4%. The potassium chloride may be a ready-to-use mixture of potassium chloride and at least one flavorant. The flavorant may be a taste masking flavorant.

In still yet another embodiment, a method for producing a lower sodium nutritional composition is provided when measures of indirect cooling are employed. The method includes preparing a slurry which includes the potassium chloride, heating the slurry to a predetermined temperature, cooling the slurry to a second predetermined temperature via a water jacket.

In still yet another embodiment, a method for producing a low sodium nutritional composition when direct methods of cooling is provided. The method includes preparing a first slurry, heating the first slurry to a first predetermined temperature, cooling the first slurry to a second predetermined temperature, and adding a second slurry to the first slurry to form a nutritional composition, wherein the second slurry comprises at least cold water and a source of potassium chloride.

In yet another embodiment, a method of masking the flavor of potassium chloride contained in a low sodium nutritional composition is provided. The method includes preparing a first slurry, heating the first slurry to a first predetermined temperature, cooling the first slurry to a second predetermined temperature, and adding a second slurry to the first slurry to form a nutritional composition, wherein the second slurry comprises at least cold water and a source of potassium chloride.

In an embodiment, the nutritional composition is formulated for a young child (e.g., about one to about 4 years of age).

In an embodiment, the method includes packaging the nutritional composition.

In an embodiment, the first slurry includes water and dry ingredients. The dry ingredients may include sodium and a food component selected from the In an embodiment, when the slurry is cooled directly, the second slurry is colder than the second predetermined temperature at the addition step. The second slurry may have a temperature of equal to or less than about 50° F. In an embodiment, the second slurry may have a temperature between about 20° F. and about 50° F. In another embodiment, the second slurry has a temperature below about 32° F.

In an embodiment, the first predetermined temperature is from about 170° F. to about 200° F., or about 180° F.

In an embodiment, the heating is accomplished by direct steam injection or indirect steam jacketed.

In an embodiment, the second predetermined temperature is from about 50° F. to about 100° F., or about 70° F.

In an embodiment, the direct cooling is accomplished by a step selected from the group consisting of adding frozen particulates to the first slurry, adding ice to the first slurry, exposing the heated slurry to ambient temperature, or combinations thereof.

In an embodiment, the second slurry comprises ice, cold water and a source of potassium chloride. The source of potassium chloride may be a ready-to-use mixture of potassium chloride and at least one flavorant. The at least one flavorant may be a taste masking flavorant. The source of potassium chloride may be present in an amount from about 0.1% to about 1.0% by weight of the nutritional composition, or 0.2% to about 0.5%, or 0.3% to about 0.4%.

In an embodiment, the method further includes the step of mixing the first slurry with the second slurry to achieve a third predetermined temperature. The third predetermined temperature may be from about 50° F. to about 100° F., or about 70° F.

In another embodiment, a method for producing a low sodium nutritional composition is provided. The method includes preparing a slurry, heating the slurry to a first predetermined temperature, cooling the slurry to a second predetermined temperature, and adding cold water, potassium chloride and a flavorant to the slurry.

In still yet another embodiment, a method of masking the flavor of potassium chloride contained in a low sodium nutritional composition is provided. The method includes preparing a slurry, heating the slurry to a first predetermined temperature, cooling the slurry to a second predetermined temperature, and adding cold water, potassium chloride and a flavorant to the slurry.

In an embodiment, the nutritional composition is formulated for a young child (e.g., from about one year to about four years of age).

In an embodiment, the method further includes packaging the nutritional composition.

In an embodiment, the potassium chloride and the flavorant are added sequentially to the slurry. Alternatively, and in an embodiment, the potassium chloride and the flavorant are added simultaneously to the slurry.

In an embodiment, the method includes mixing the potassium chloride and flavorant to form a mixture. The mixture is present in the nutritional composition in an amount from about 0.1% to about 1.0% by weight of the nutritional composition, or 0.2% to about 0.5%, or 0.3% to about 0.4%.

In an embodiment, the slurry includes water and dry ingredients for the nutritional composition. The dry ingredients may include sodium and a food component selected from the group consisting of meat, cheese, yogurt, grains, pasta, fruit, vegetables, or combinations thereof. The dry ingredients may also include starches, seasonings, herbs, flavors, or combinations thereof.

In an embodiment, the first predetermined temperature is from about 170° F. to about 200° F., or about 180° F.

In an embodiment, the heating is accomplished by direct steam injection or indirect steam jacketed.

In an embodiment, the second predetermined temperature is from about 50° F. to about 100° F. or about 70° F.

In an embodiment, the cooling is accomplished by a step selected from the group consisting of adding frozen particulates to the slurry, adding ice to the slurry, exposing the heated slurry to ambient temperature, or combinations thereof.

In an embodiment, the method further includes adding ice to the slurry after the cooling step.

In an embodiment, the step of adding cold water, potassium chloride and a flavorant to the slurry cools the slurry to a third predetermined temperature that is from about 50° F. to about 100° F., or about 70° F.

An advantage of the present disclosure is to provide improved nutritional compositions in meal options for young children meeting a targeted sodium level and possible increased potassium level.

Another advantage of the present disclosure is to provide nutritional compositions having a reduced sodium content with satisfying flavors.

Yet another advantage of the present disclosure is to provide nutritional compositions that provide a consumer with targeted levels of macro- and micro-nutrients.

Still yet another advantage of the present disclosure is to provide methods of making an improved nutritional composition.

Another advantage of the present disclosure is to provide batching methods for preparing nutritional compositions with targeted sodium levels having desirable organoleptic properties.

Yet another advantage is to provide methods of preparing nutritional compositions with targeted levels of sodium and having potassium chloride ("KCl").

Additional features and advantages are described herein, and will be apparent from the following Detailed Description and the figures.

DETAILED DESCRIPTION

Figure 1:
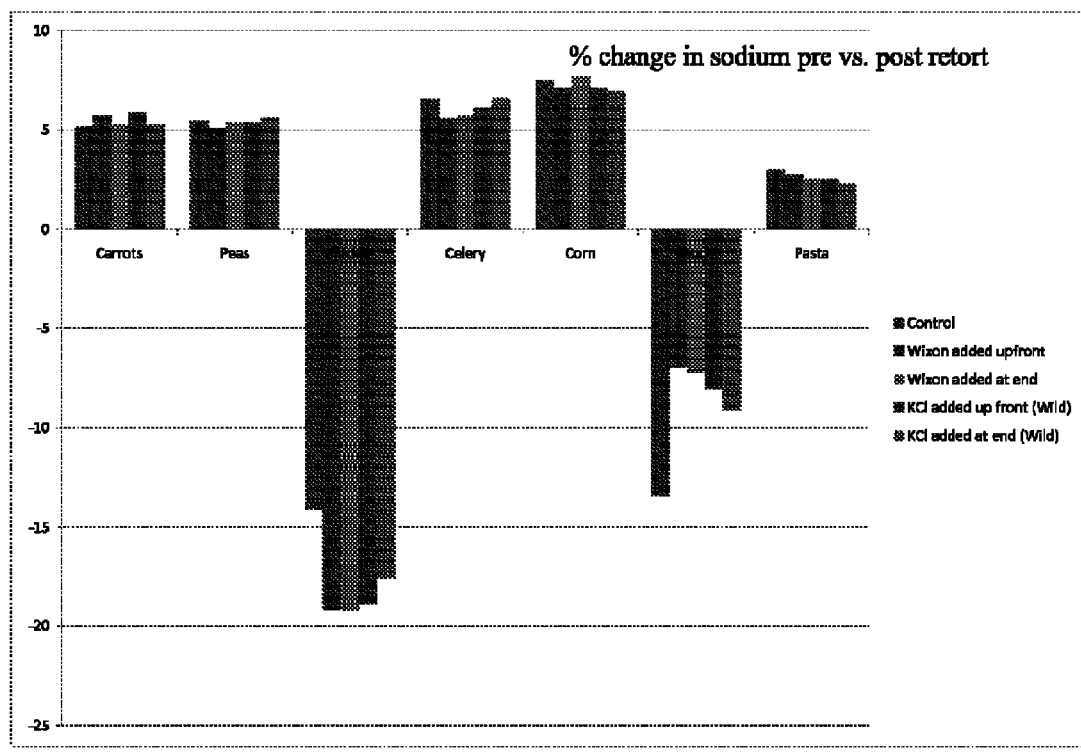
FIG. 1 illustrates a percentage change in sodium distribution of a composition prior to and after retorting in accordance with an embodiment of the present disclosure.

As used herein, "about" is understood to refer to numbers in a range of numerals. Moreover, all numerical ranges herein should be understood to include all integer, whole or fractions, within the range.

As used herein the term "amino acid" is understood to include one or more amino acids. The amino acid can be, for example, alanine, arginine, asparagine, aspartate, citrulline, cysteine, glutamate, glutamine, glycine, histidine, hydroxyproline, hydroxyserine, hydroxytyrosine, hydroxylysine, isoleucine, leucine, lysine, methionine, phenylalanine, proline, serine, taurine, threonine, tryptophan, tyrosine, valine, or combinations thereof.

As used herein, "animal" includes, but is not limited to, mammals, which include but is not limited to, rodents, aquatic mammals, domestic animals such as dogs and cats, farm animals such as sheep, pigs, cows and horses, and humans. Wherein the terms "animal" or "mammal" or their plurals are used, it is contemplated that it also applies to any animals that are capable of the effect exhibited or intended to be exhibited by the context of the passage.

As used herein, the term "antioxidant" is understood to include any one or more of various substances such as beta-carotene (a vitamin A precursor), vitamin C, vitamin E, and selenium that inhibit oxidation or reactions promoted by Reactive Oxygen Species ("ROS") and other radical and non-radical species. Additionally, antioxidants are molecules capable of slowing or preventing the oxidation of other molecules. Non-limiting examples of antioxidants include carotenoids, coenzyme Q10 ("CoQ10"), flavonoids, glutathione, Goji (wolfberry), hesperidin, lactowolfberry, lignan, lutein, lycopene, polyphenols, selenium, vitamin A, vitamin $B_1$, vitamin $B_6$, vitamin $B_{12}$, vitamin C, vitamin D, vitamin E, zeaxanthin, or combinations thereof.

As used herein, "complete nutrition" means nutritional products that contain sufficient types and levels of macronutrients (protein, fats and carbohydrates) and micronutrients to be sufficient to be a sole source of nutrition for the animal to which it is administered.

As used herein, "effective amount" is an amount that prevents a deficiency, treats a disease or medical condition in an individual or, more generally, reduces symptoms, manages progression of the diseases or provides a nutritional, physiological, or medical benefit to the individual. A treatment can be patient- or doctor-related.

As used herein, "incomplete nutrition" are nutritional products that do not contain sufficient levels of macronutrients (protein, fats and carbohydrates) or micronutrients to be sufficient to be a sole source of nutrition for the animal to which it is administered.

While the terms "individual" and "patient" are often used herein to refer to a human, the invention is not so limited. Accordingly, the terms "individual" and "patient" refer to any animal, mammal or human having or at risk for a medical condition that can benefit from the treatment.

As used herein, non-limiting examples of sources of ω-3 fatty acids such as α-linolenic acid ("ALA"), docosahexaenoic acid ("DHA") and eicosapentaenoic acid ("EPA") include fish oil, krill, poultry, eggs, or other plant or nut sources such as flax seed, walnuts, almonds, algae, modified plants, etc.

As used herein, "food grade micro-organisms" means micro-organisms that are used and generally regarded as safe for use in food.

As used herein, "mammal" includes, but is not limited to, rodents, aquatic mammals, domestic animals such as dogs and cats, farm animals such as sheep, pigs, cows and horses, and humans. Wherein the term "mammal" is used, it is contemplated that it also applies to other animals that are capable of the effect exhibited or intended to be exhibited by the mammal.

The term "microorganism" is meant to include the bacterium, yeast and/or fungi, a cell growth medium with the microorganism, or a cell growth medium in which microorganism was cultivated.

As used herein, the term "minerals" is understood to include boron, calcium, chromium, copper, iodine, iron, magnesium, manganese, molybdenum, nickel, phosphorus, potassium, selenium, silicon, tin, vanadium, zinc, or combinations thereof.

As used herein, a "non-replicating" microorganism means that no viable cells and/or colony forming units can be detected by classical plating methods. Such classical plating methods are summarized in the microbiology book: James Monroe Jay, et al., *Modern food microbiology*, 7th edition, Springer Science, New York, N.Y. p. 790 (2005). Typically, the absence of viable cells can be shown as follows: no visible colony on agar plates or no increasing turbidity in liquid growth medium after inoculation with different concentrations of bacterial preparations ('non replicating' samples) and incubation under appropriate conditions (aerobic and/or anaerobic atmosphere for at least 24 h). For example, bifidobacteria such as *Bifidobacterium longum*, *Bifidobacterium lactis* and *Bifidobacterium breve* or lactobacilli, such as *Lactobacillus paracasei* or *Lactobacillus rhamnosus*, may be rendered non-replicating by heat treatment, in particular low temperature/long time heat treatment.

As used herein, a "nucleotide" is understood to be a subunit of deoxyribonucleic acid ("DNA") or ribonucleic acid ("RNA"). It is an organic compound made up of a nitrogenous base, a phosphate molecule, and a sugar molecule (deoxyribose in DNA and ribose in RNA). Individual nucleotide monomers (single units) are linked together to form polymers, or long chains. Exogenous nucleotides are specifically provided by dietary supplementation. The exogenous nucleotide can be in a monomeric form such as, for example, 5'-Adenosine Monophosphate ("5'-AMP"), 5'-Guanosine Monophosphate ("5'-GMP"), 5'-Cytosine Monophosphate ("5'-CMP"), 5'-Uracil Monophosphate ("5'-UMP"), 5'-Inosine Monophosphate ("5'-IMP"), 5'-Thymine Monophosphate ("5'-TMP"), or combinations thereof. The exogenous nucleotide can also be in a polymeric form such as, for example, an intact RNA. There can be multiple sources of the polymeric form such as, for example, yeast RNA.

"Nutritional compositions," as used herein, are understood to include any number of wholesome food ingredients and possibly optional additional ingredients based on a functional need in the product and in full compliance with all applicable regulations. The optional ingredients may include, but are not limited to, conventional food additives, for example one or more, acidulants, additional thickeners, buffers or agents for pH adjustment, chelating agents, colorants, emulsifies, excipient, flavor agent, mineral, osmotic agents, a pharmaceutically acceptable carrier, preservatives, stabilizers, sugar, sweeteners, texturizers, and/or vitamins. The optional ingredients can be added in any suitable amount.

As used herein the term "patient" is understood to include an animal, especially a mammal, and more especially a human that is receiving or intended to receive treatment, as it is herein defined.

As used herein, "phytochemicals" or "phytonutrients" are non-nutritive compounds that are found in many foods. Phytochemicals are functional foods that have health benefits beyond basic nutrition, and are health promoting compounds that come from plant sources. "Phytochemicals" and "Phytonutrients" refers to any chemical produced by a plant that imparts one or more health benefit on the user. Non-limiting examples of phytochemicals and phytonutrients include those that are:

i) phenolic compounds which include monophenols (such as, for example, apiole, carnosol, carvacrol, dillapiole, rosemarinol); flavonoids (polyphenols) including flavonols (such as, for example, quercetin, fingerol, kaempferol, myricetin, rutin, isorhamnetin), flavanones (such as, for example, fesperidin, naringenin, silybin, eriodictyol), flavones (such as, for example, apigenin, tangeritin, luteolin), flavan-3-ols (such as, for example, catechins, (+)-catechin, (+)-gallocatechin, (−)-epicatechin, (−)-epigallocatechin, (−)-epigallocatechin gallate (EGCG), (−)-epicatechin 3-gallate, theaflavin, theaflavin-3-gallate, theaflavin-3'-gallate, theaflavin-3,3'-digallate, thearubigins), anthocyanins (flavanols) and anthocyanidins (such as, for example, pelargonidin, peonidin, cyanidin, delphinidin, malvidin, petunidin), isoflavones (phytoestrogens) (such as, for example, daidzein (formononetin), genistein (biochanin A), glycitein), dihydroflavonols, chalcones, coumestans (phytoestrogens), and Coumestrol; Phenolic acids (such as: Ellagic acid, Gallic acid, Tannic acid, Vanillin, curcumin); hydroxycinnamic acids (such as, for example, caffeic acid, chlorogenic acid, cinnamic acid, ferulic acid, coumarin); lignans (phytoestrogens), silymarin, secoisolariciresinol, pinoresinol and lariciresinol); tyrosol esters (such as, for example, tyrosol, hydroxytyrosol, oleocanthal, oleuropein); stilbenoids (such as, for example, resveratrol, pterostilbene, piceatannol) and punicalagins;

ii) terpenes (isoprenoids) which include carotenoids (tetraterpenoids) including carotenes (such as, for example, α-carotene, β-carotene, γ-carotene, δ-carotene, lycopene, neurosporene, phytofluene, phytoene), and xanthophylls (such as, for example, canthaxanthin, cryptoxanthin, aeaxanthin, astaxanthin, lutein, rubixanthin); monoterpenes (such as, for example, limonene, perillyl alcohol); saponins; lipids including: phytosterols (such as, for example, campesterol, beta sitosterol, gamma sitosterol, stigmasterol), tocopherols (vitamin E), and ω-3, -6, and -9 fatty acids (such as, for example, gamma-linolenic acid); triterpenoid (such as, for example, oleanolic acid, ursolic acid, betulinic acid, moronic acid);

iii) betalains which include Betacyanins (such as: betanin, isobetanin, probetanin, neobetanin); and betaxanthins (non glycosidic versions) (such as, for example, indicaxanthin, and vulgaxanthin);

iv) organosulfides, which include, for example, dithiolthiones (isothiocyanates) (such as, for example, sulphoraphane); and thiosulphonates (allium compounds) (such as, for example, allyl methyl trisulfide, and diallyl sulfide), indoles, glucosinolates, which include, for example, indole-3-carbinol; sulforaphane; 3,3'-diindolylmethane; sinigrin; allicin; alliin; allyl isothiocyanate; piperine; syn-propanethial-S-oxide;

v) protein inhibitors, which include, for example, protease inhibitors;

vi) other organic acids which include oxalic acid, phytic acid (inositol hexaphosphate); tartaric acid; and anacardic acid; or vii) combinations thereof.

As used herein, a "prebiotic" is a food substance that selectively promotes the growth of beneficial bacteria or inhibits the growth or mucosal adhesion of pathogenic bacteria in the intestines. They are not inactivated in the stomach and/or upper intestine or absorbed in the gastrointestinal tract of the person ingesting them, but they are fermented by the gastrointestinal microflora and/or by probiotics. Prebiotics are, for example, defined by Glenn R. Gibson and Marcel B. Roberfroid, *Dietary Modulation of the Human Colonic Microbiota: Introducing the Concept of Prebiotics*, J. Nutr. 1995 125: 1401-1412. Non-limiting examples of prebiotics include acacia gum, alpha glucan, arabinogalactans, beta glucan, dextrans, fructooligosaccharides, fucosyllactose, galactooligosaccharides, galactomannans, gentiooligosaccharides, glucooligosaccharides, guar gum, inulin, isomaltooligosaccharides, lactoneotetraose, lactosucrose, lactulose, levan, maltodextrins, milk oligosaccharides, partially hydrolyzed guar gum, pecticoligosaccharides, resistant starches, retrograded starch, sialooligosaccharides, sialyllactose, soyoligosaccharides, sugar alcohols, xylooligosaccharides, or their hydrolysates, or combinations thereof.

As used herein, probiotic micro-organisms (hereinafter "probiotics") are food-grade microorganisms (alive, including semi-viable or weakened, and/or non-replicating), metabolites, microbial cell preparations or components of microbial cells that could confer health benefits on the host when administered in adequate amounts, more specifically, that beneficially affect a host by improving its intestinal microbial balance, leading to effects on the health or well-being of the host. See, Salminen S, Ouwehand A. Benno Y. et al., "Probiotics: how should they be defined?," *Trends Food Sci. Technol.*, 1999:10, 107-10. In general, it is believed that these micro-organisms inhibit or influence the growth and/or metabolism of pathogenic bacteria in the intestinal tract. The probiotics may also activate the immune function of the host. For this reason, there have been many different approaches to include probiotics into food products. Non-limiting examples of probiotics include *Aerococcus, Aspergillus, Bacillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or combinations thereof.

The terms "protein," "peptide," "oligopeptides" or "polypeptide," as used herein, are understood to refer to any composition that includes, a single amino acids (monomers), two or more amino acids joined together by a peptide bond (dipeptide, tripeptide, or polypeptide), collagen, precursor, homolog, analog, mimetic, salt, prodrug, metabolite, or fragment thereof or combinations thereof. For the sake of clarity, the use of any of the above terms is interchangeable unless otherwise specified. It will be appreciated that polypeptides (or peptides or proteins or oligopeptides) often contain amino acids other than the 20 amino acids commonly referred to as the 20 naturally occurring amino acids, and that many amino acids, including the terminal amino acids, may be modified in a given polypeptide, either by natural processes such as glycosylation and other post-translational modifications, or by chemical modification techniques which are well known in the art. Among the known modifications which may be present in polypeptides of the present invention include, but are not limited to, acetylation, acylation, ADP-ribosylation, amidation, covalent attachment of a flavanoid or a heme moiety, covalent attachment of a polynucleotide or polynucleotide derivative, covalent attachment of a lipid or lipid derivative, covalent attachment of phosphatidylinositol, cross-linking, cyclization, disulfide bond formation, demethylation, formation of covalent cross-links, formation of cystine, formation of pyroglutamate, formylation, gamma-carboxylation, glycation, glycosylation, glycosylphosphatidyl inositol ("GPI") membrane anchor formation, hydroxylation, iodination, methylation, myristoylation, oxidation, proteolytic processing, phosphorylation, prenylation, racemization, selenoylation, sulfation, transfer-RNA mediated addition of amino acids to polypeptides such as arginylation, and ubiquitination. The term "protein" also includes "artificial proteins" which refers to linear or non-linear polypeptides, consisting of alternating repeats of a peptide.

Non-limiting examples of proteins include dairy based proteins, plant based proteins, animal based proteins and artificial proteins. Dairy based proteins include, for example, casein, caseinates (e.g., all forms including sodium, calcium, potassium caseinates), casein hydrolysates, whey (e.g., all forms including concentrate, isolate, demineralized), whey hydrolysates, milk protein concentrate, and milk protein isolate. Plant based proteins include, for example, soy protein (e.g., all forms including concentrate and isolate), pea protein (e.g., all forms including concentrate and isolate), canola protein (e.g., all forms including concentrate and isolate), other plant proteins that commercially are wheat and fractionated wheat proteins, corn and it fractions including zein, rice, oat, potato, peanut, green pea powder, green bean powder, and any proteins derived from beans, lentils, and pulses. Animal based proteins may be selected from the group consisting of beef, poultry, fish, lamb, seafood, or combinations thereof.

As used herein, a "synbiotic" is a supplement that contains both a prebiotic and a probiotic that work together to improve the microflora of the intestine.

As used herein, the terms "treatment," "treat" and "to alleviate" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The term does not necessarily imply that a subject is treated until total recovery. The terms "treatment" and "treat" also refer to the maintenance and/or promotion of health in an individual not suffering from a disease but who may be susceptible to the development of an unhealthy condition, such as nitrogen imbalance or muscle loss. The terms "treatment," "treat" and "to alleviate" are also intended to include the potentiation or otherwise enhancement of one or more primary prophylactic or therapeutic measure. The terms "treatment," "treat" and "to alleviate" are further intended to include the dietary management of a disease or condition or the dietary management for prophylaxis or prevention a disease or condition.

As used herein the term "vitamin" is understood to include any of various fat-soluble or water-soluble organic substances (non-limiting examples include vitamin A, Vitamin B1 (thiamine), Vitamin B2 (riboflavin), Vitamin B3 (niacin or niacinamide), Vitamin B5 (pantothenic acid), Vitamin B6 (pyridoxine, pyridoxal, or pyridoxamine, or pyridoxine hydrochloride), Vitamin B7 (biotin), Vitamin B9 (folic acid), and Vitamin B12 (various cobalamins; commonly cyanocobalamin in vitamin supplements), vitamin C, vitamin D, vitamin E, vitamin K, folic acid and biotin) essential in minute amounts for normal growth and activity of the body and obtained naturally from plant and animal foods or synthetically made, pro-vitamins, derivatives, analogs.

In an embodiment, a source of vitamins or minerals can include at least two sources or forms of a particular nutrient. This represents a mixture of vitamin and mineral sources as found in a mixed diet. Also, a mixture may also be protective in case an individual has difficulty absorbing a specific form, a mixture may increase uptake through use of different transporters (e.g., zinc, selenium), or may offer a specific health benefit. As an example, there are several forms of vitamin E, with the most commonly consumed and researched being tocopherols (alpha, beta, gamma, delta) and, less commonly, tocotrienols (alpha, beta, gamma, delta), which all vary in biological activity. There is a structural difference such that the tocotrienols can more freely move around the cell membrane; several studies report various health benefits related to cholesterol levels, immune health, and reduced risk of cancer development. A mixture of tocopherols and tocotrienols would cover the range of biological activity.

The present disclosure relates to nutritional compositions with targeted sodium levels and methods of making and using nutritional compositions with targeted sodium levels. The present invention provides nutritional compositions for young children that meet their taste requirements while meeting a targeted level of sodium, and providing macronutrients and micronutrients needed in a child's daily diet.

Currently, there are no regulated healthy claim criteria for foods or meals for children under four years of age. However, there are dietary recommendations for daily nutrient and food group amounts for children less than four years of age. The sensation of taste has a profound biological significance with ramifications beyond providing people with pleasurable culinary experiences. Taste conveys many cues to humans and other animals. For example, the ability to taste allows us to identify tainted or spoiled foods, and provides satisfying responses that may be proportionate to caloric or nutritive value. There are generally considered to be five categories of taste: sweet, sour, bitter, salty and umami (savory). See, McGregor, R., Food Technol. 58(5):24-30 (2004). These tastes can be sub-classified as the appetitive tastes—salty, sweet and umami, and the aversive tastes—bitter and sour. The appetitive tastes are pleasurable and are associated with nutrient-containing foods. The aversive tastes may be elicited by toxic compounds, and thereby protect an animal by discouraging the ingestion of unhealthy or dangerous foods. Each of these tastes results from substances that may be referred to as "tastants."

A well known salty tastant is sodium chloride (i.e., common table salt, "NaCl"). Sodium chloride is found in many different types of foods, condiments and beverages. Sodium chloride is also added to foods, condiments and beverages to make them more enjoyable and more pleasing to the consumer. While sodium is necessary in human physiology, in some sodium sensitive individuals, too much sodium can have adverse effects. There is limited and inconclusive data on the effects of excess sodium intake in young children. However, it is prudent to develop foods with less sodium to encourage development of a lower sodium taste preference with the hope that children will desire less sodium in foods as they get older and consume diets with a moderate amount of sodium. Additionally, excessive intake of sodium can increase the risk of high blood pressure and heart disease, among other health issues, and is generally unhealthy for young children at high levels.

To provide nutritional compositions in line with dietary recommendations for the total population, many companies either develop products without salt/sodium, or remove such a great amount from existing products that the taste of the food composition is severely compromised. The elimination or removal of too much salt or sodium could be particularly problematic with young children, where picky eating is common, and taste is an important criteria in food acceptance.

One approach to eliminating the negative effects of excessive salt/sodium intake, is to substitute potassium chloride ("KCl") as a saltening agent either partially, or wholly, for sodium chloride ("NaCl"). See, Kuramitsu, R., Advances in Exp. Med. Biol., 542:227-238 (2004). Indeed, there are potassium chloride products already on the market, such as Cardia® Salt, No Salt®, Morton® Salt Substitute (U.S. Pat. No. 3,505,082), and AlsoSalt® (U.S. Pat. No. 5,897,908). Many of these products include agents such as L-lysine, to modify or mask the unpleasant taste of potassium chloride. Recent nutritional guidelines not only suggest that the amount of sodium in the diet (ingested principally as sodium chloride) should be reduced, but that the amount of potassium in the diet should be increased. See, Anderson, J., et al., "Potassium and Health," Colorado State University Cooperative Extension-Nutrition Resources: Fact Sheet No. 9.355 (accessed May 15, 2005)). Potassium is involved in nerve function, muscle control and blood pressure. An insufficient potassium level in the body may, for example, cause muscle cramping during exercise, or cardiovascular irregularities. See, Id.

Thus, substituting dietary potassium chloride for dietary sodium chloride could provide at least two health benefits. First, it could reduce sodium intake, which could decrease the risk of hypertension, associated heart disease, and other general health concerns. Second, it could increase potassium intake, which is typically below recommended levels in most modern diets. Despite these benefits, substituting potassium chloride for sodium chloride faces a major obstacle because potassium has a strong bitter taste that is not particularly enjoyable when consumed.

Another obstacle to the development of a palatable potassium chloride salt substitute is the requirement that flavorings added to foods or beverages meet Flavor and Extract Manufacturers Association, Generally Recognized as Safe ("FEMA GRAS") guidelines or be approved by the U.S. Food and Drug Administration. Substances that might be used to inhibit the bitter taste of potassium must meet these guidelines. The use of bitterness inhibitors not already accepted by FEMA GRAS present increased development costs and delayed market entry for food and beverage companies trying to develop better salt substitutes, and flavored seasoning compositions containing them.

Attempts to eliminate the bitter taste of potassium chloride have taken two distinct approaches. One is to use "maskers" to cover the bitter taste. These maskers are highly flavorful ingredients such as onion, garlic, paprika, red pepper, chili powder, and other spices. None of these maskers have found wide-spread acceptance, however, probably due to the fact that the bitter taste of potassium is still detectable despite the presence of the masker. The second approach is to use compounds that reduce the bitter taste of potassium without imparting another unpleasant taste. U.S. Pat. No. 5,631,299 to Kurtz et al. and incorporated herein by reference in its entirety, discloses that taurine may reduce the bitter taste of potassium chloride without producing another unpleasant taste, if used in the right amount. Neither of these approaches has proven acceptable for foods given to young children since their taste buds are still quite sensitive and any flavor masker must be safe for young children less than four years of age. Moreover, it is critical in salt replacement that the young child is provided with a targeted level of sodium, in a nutritional composition of wholesome foods that deliver macronutrients and micronutrients for healthy growth and development. Optimizing both the level of KCl and a sodium replacement system for existing products is critical for flavor performance for nutritional compositions intended for administration to young children.

Examples of beneficial amounts of ingredients for various meals and side dishes for toddlers are presented below in the Tables. For example, Table 1 illustrates the basic nutritional ingredients for a toddler vegetable dish, side dishes without vegetables, vegetarian meals without cheese and main meals with meat, fish and/or cheese. The toddler dishes, whether side dishes, meals (e.g., entrees), snacks, etc., may be prepackaged and sold to a consumer via known retail means. In this regard, the toddler dishes may be packaged at the end of a manufacturing process and after cooling, bundled, and sold to retailers to be placed on retail shelves.

Vegetable dishes and side dishes are designed to be part of a meal or a side dish to be mixed with other food items or starch ingredients. As such, these non-vegetable side dishes may include, for example, pasta, rice, potatoes, corn/maize, etc.

The main meal portion of a toddler's diet is designed to be a nutritionally balanced complete meal. The meal should be a well-balanced composition of carbohydrates, lipids and proteins, and contain appropriate levels and types of fat for infants and toddlers/preschoolers. Complex carbohydrates may be provided by starchy ingredients such as, for example, the wheat found in pasta, rice, potatoes, corn/maize, etc, and the fiber found in, for example, vegetables.

If the main meal includes meat, fish and/or cheese, the meal also provides the toddler with a natural source of protein, iron and iodine (in fish). If the main meal is a vegetarian meal that does not contain cheese, the toddler's diet may include other natural sources of protein such as, for example, legumes.

Table 1 provides exemplary embodiments of appropriate amounts of ingredients found in a toddler's diet. As shown in Table 1, the nutritional compositions include low amounts of sodium for all stages of a toddler's development. Further, at Stage 1 (supported sitter, 4 mos. up to 6 mos.) and Stage 2 (sitter, 6 mos. up to 9 mos.), no additional salt is added to the composition.

TABLE 1

|  | Vegetable Dishes | Other Side Dishes w/o Vegetable | Vegeterian Meals w/o Cheese | Meals with Meat/Fish/Cheese |
| --- | --- | --- | --- | --- |
| Ingredients | >50% vegetables | | >35% vegetables including legumes and fruits | |
| Energy | <80 kcal/100 g | <80 kcal/100 g | 55-100 kcal/100 g | 55-100 kcal/100 g |
| Total Protein | NA | NA | <5 g/100 kcal | <7 g/100 kcal |
| Fibre | <5 g/serving | <5 g/serving | <5 g/serving | <5 g/serving |
| Total fat | | | >2.8 g/100 kcal | >2.8 g/100 kcal |
| Saturated fat | <1.1 g/100 kcal | <1.1 g/100 kcal OR <2.5 g/100 kcal (if contains cheese) | <2.5 g/100 kcal | <2.5 g/100 kcal |
| Trans fatty acids (not including the TFA from milk or meat sources) | <3% of total fat | <3% of total fat | <3% of total fat | <3% of total fat |
| Salt/Sodium | Stages 1 & 2: No added salt All Stages: sodium <200 mg/ 100 kcal OR 100 g | Stages 1 & 2: No added salt All Stages: sodium <200 mg/ 100 kcal OR 100 g | Stages 1 & 2: No added salt All Stages: sodium <200 mg/ 100 kcal OR 100 g | Stages 1 & 2: No added salt All Stages: sodium <200 mg/ 100 kcal OR 100 g | dishes. The vegetable side dishes are generally nutritionally incomplete and require supplementation, or will be a supplement itself, with other portions of a meal (e.g., a meat dish to provide protein). Vegetable dishes may include one type of vegetable or may be a mix of several different kinds of vegetables. These side dishes provide complex carbohydrates, fiber, vitamins and minerals and other phytonutrients that are important to include in a toddler's daily diet. Side dishes comprising mainly vegetables are not intended to be a source of protein for a toddler.

Toddler diets may also include other side dishes that do not include vegetables. For example, macaroni and cheese, mashed potatoes or pasta salad may be served to a toddler instead of, or as a supplement to, vegetable side dishes or main meal dishes. These side dishes not containing vegetables may be served to a toddler to supplement the toddler's diet with an adequate amount of complex carbohydrates from Table 2 demonstrates exemplary nutritional ingredients for toddler foods comprising fruit products, fruit desserts, fruit and cereals and milky desserts and yogurts. These products provide a toddler primarily with carbohydrates and are a good source of vitamins, minerals and phytonutrients.

Fruit products are products that are predominantly fruit, while fruit desserts are products that may contain both fruit juice and pulp. Fruit desserts are designed to be desserts and, as such, typically contain added sweeteners for flavoring purposes. Milky desserts and yogurts, however, are formulated to provide proteins and lipids to a toddler, as well as carbohydrates that come from fruits. Milky desserts and yogurts are good natural sources of the vitamins and minerals found in milk products (e.g., vitamin B2, calcium, etc.). Fruit and cereal products combine fruits and grains or cereals, thereby providing a good source of carbohydrates to a toddler. As shown in Table 2, no additional salt is added to the composition.

TABLE 2

|  | Fruit Products | Fruit Dessert | Fruit & Cereal | Milky Desserts & Yogurt |
|---|---|---|---|---|
| Ingredients | >65% fruit puree/pulp | >55% fruit juice and fruit pulp |  | >10% milk ingredients |
| Energy | <100 kcal/100 g | <100 kcal/100 g | <100 kcal/100 g | 67-100 kcal/100 g |
| Total protein |  |  |  | <3.75 g/100 kcal |
| Added sugars | <2.5 g/100 kcal | <6.25 g/100 kcal | <2.5 g/100 kcal | <6.25 g/100 kcal |
| Fibre | <5 g/serving |  | <5 g/serving |  |
| Trans fatty acids (not including TFA from milk or meat sources) |  |  |  | <3% of total fat |
| Salt/Sodium | No added salt (sodium) | No added salt (sodium) | No added salt (sodium) | No added salt (sodium) |

Table 3 illustrates an exemplary embodiments of a toddler meat dish that may be served as a main meal. As mentioned briefly above, meat dishes are typically served as a main meal portion of a toddler's diet that is typically supplemented with at least one side dish. Meat dishes provide the toddler with an excellent natural source of protein and iron. As shown in Table 3, the nutritional compositions include low amounts of sodium for all stages of a toddler's development.

TABLE 3

| Meat dishes | |
|---|---|
| Ingredients | >40% meat w/w |
| Total protein | >7 g/100 kcal |
| Total fat | <6 g/100 kcal |
| Saturated fat | <2.5 g/100 kcal |
| Salt/Sodium | All Stages: sodium <200 mg/100 kcal OR 100 g |

Table 4 demonstrates an example of nutritional criteria for "in-betweens." In-between products are often hand-held by a toddler and are designed to be consumed between meals, or as part of a meal as a supplement. These in-between dishes are intended to be consumed as an occasional food with limited portion sizes, and provide the toddler mainly with carbohydrates from grains/cereals, fruits, or vegetables with added sugars and fat. As is shown by Table 4, the in-between dishes include less than 50 mg of sodium per serving for an infant (e.g., <1 year of age), and less than 100 mg per serving for a toddler (e.g., >1 year of age).

TABLE 4

| In-Betweens | |
|---|---|
| Energy | <50 kcal per serving - infant<br><100 kcal per serving - toddler |
| Trans fatty acids (not including TFA from milk or meat sources) | No partially hydrogenated oils; |
| Salt/Sodium | <50 mg per serving infant<br><100 mg per serving toddler |

The present nutritional compositions may also include other beneficial or functional ingredients. For example, the nutritional compositions may include a source of protein. The protein source may be dietary protein including, but not limited to animal protein (such as meat protein or egg protein), dairy protein (such as casein, caseinates (e.g., all forms including sodium, calcium, potassium caseinates), casein hydrolysates, whey (e.g., all forms including concentrate, isolate, demineralized), whey hydrolysates, milk protein concentrate, and milk protein isolate)), vegetable protein (such as soy protein, wheat protein, rice protein, and pea protein), or combinations thereof. In an embodiment, the protein source is selected from the group consisting of whey, chicken, corn, caseinate, wheat, flax, soy, carob, pea, or combinations thereof.

In an embodiment, the nutritional compositions further include one or more prebiotics. The prebiotics may be selected from the group consisting of acacia gum, alpha glucan, arabinogalactans, beta glucan, dextrans, fructooligosaccharides, galactooligosaccharides, galactomannans, gentiooligosaccharides, glucooligosaccharides, guar gum, inulin, isomaltooligosaccharides, lactosucrose, lactulose, levan, maltodextrins, partially hydrolyzed guar gum, pecticoligosaccharides, retrograded starch, soyoligosaccharides, sugar alcohols, xylooligosaccharides, or combinations thereof.

In an embodiment, the nutritional compositions further include one or more probiotics selected from the group consisting of *Aerococcus, Aspergillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or combinations thereof.

The nutritional compositions may also include a source of fiber, fiber or a blend of different types of fiber. The fiber blend may contain a mixture of soluble and insoluble fibers. Soluble fibers may include, for example, fructooligosaccharides, acacia gum, inulin, etc. Insoluble fibers may include, for example, pea outer fiber.

In an embodiment, the nutritional compositions further include a source of carbohydrates. Any suitable carbohydrate may be used in the present nutritional compositions including, but not limited to, sucrose, lactose, glucose, fructose, corn syrup solids, maltodextrin, modified starch, amylose starch, tapioca starch, corn starch, or combinations thereof.

In an embodiment, the nutritional compositions further include a source of fat. The source of fat may include any suitable fat or fat mixture. For example, the fat may include, but is not limited to, vegetable fat (such as olive oil, corn oil, sunflower oil, rapeseed oil, hazelnut oil, soy oil, palm oil, coconut oil, canola oil, lecithins, and the like) and animal fats (such as milk fat).

In another embodiment, the nutritional composition further includes one or more amino acids. Non-limiting examples of amino acids include isoleucine, alanine, leucine, asparagine, lysine, aspartate, methionine, cysteine, phenylalanine, glutamate, threonine, glutamine, tryptophan, glycine, valine, proline, serine, tyrosine, arginine, citrulline, histidine, or combinations thereof.

In an embodiment, the nutritional composition further includes one or more synbiotics, phytonutrients and/or antioxidants. The antioxidants may be selected from the group consisting of carotenoids, coenzyme Q10 ("CoQ10"), flavonoids, glutathione, Goji (Wolfberry), hesperidin, Lactowolfberry, lignan, lutein, lycopene, polyphenols, selenium, vitamin A, vitamin B1, vitamin B6, vitamin B12, vitamin C, vitamin D, vitamin E, or combinations thereof.

In an embodiment, the nutritional composition further includes one or more vitamins and minerals. Non-limiting examples of vitamins include Vitamins A, B-complex (such as B-1, B-2, B-6 and B-12), C, D, E and K, niacin and acid vitamins such as pantothenic acid and folic acid, biotin, or combinations thereof. Non-limiting examples of minerals include calcium, iron, zinc, magnesium, iodine, copper, phosphorus, manganese, potassium, chromium, molybdenum, selenium, nickel, tin, silicon, vanadium, boron, or combinations thereof.

Other optional ingredients can be added to make the nutritional composition sufficiently palatable. For example, the nutritional compositions of the present disclosure can optionally include conventional food additives, such as any of, acidulants, additional thickeners, buffers or agents for pH adjustment, chelating agents, colorants, emulsifiers, excipients, flavor agents, minerals, osmotic agents, pharmaceutically acceptable carriers, preservatives, stabilizers, sugars, sweeteners, texturizers, or combinations thereof. The optional ingredients can be added in any suitable amount.

Indeed, any functional or optional ingredients may be added to improve the present nutritional compositions so long as the present compositions provide a targeted level of sodium and/or micro- and macronutrients to a young child. As discussed briefly above, the present nutritional compositions may include sodium in an amount that is equal to or less than 200 mg per 100 kcal nutritional composition, or an amount of sodium that is equal to or less than 200 mg per 100 g of nutritional composition.

As is shown above, it is important to provide young children with diets that are well-balanced, while providing proper amounts of sodium, macro- and micro-nutrients. In an effort to achieve a sodium reduction in nutritional compositions for young children, Applicant has surprisingly found that batching such foods in a manner in accordance with the present disclosure allows for sodium reduction via sodium substitution with KCl, without negatively affecting the desirable flavor characteristics of the nutritional compositions.

In addition to the present nutritional compositions with targeted sodium levels, methods of manufacturing nutritional compositions with targeted sodium levels are also provided. Applicant has found that if ice is used directly to cool a batch, the flavor balance of the system may be severely compromised. This issue can be avoided if the methods of batching the product are modified. One solution to alleviate this problem includes not using ice or water to directly cool a batch. However, not all factories have jackets equipped with a cooling valve to cool the batches indirectly prior to filling. Another solution would be to not use a sodium replacement system that requires KCl. Non-KCl solutions are beginning to surface with flavor houses, however, they are very much in their infancy and therefore are not capable of meeting the needs of sodium targets/reduction now.

Prior to development of the presently disclosed manufacturing methods, manufacturing methods were unable to achieve an acceptable product at a pilot plant or at the scaled-up factory level since the bitter metallic notes of KCl were very evident when ice or water was used directly to cool the batch. However, if KCl-based solutions are not used in a reduced sodium system, the flavors tend to be very bland and unappetizing. Therefore, using KCl is critical to be on par with, or better than, any current higher-sodium composition offering.

Applicant has surprisingly found that when creating recipes with KCl-based solutions and that ice or water is needed to directly cool the batch, the flavor balance of the system is not compromised if KCl is added at the end of the batching process using an ice cold water slurry, where the KCl is provided in an amount equal to its saturation point in the slurry (22 g/100 g), or is supersaturated. Once the recipe has been batched and directly cooled with ice or water, the colder KCl slurry may be added to the batch and mixed adequately. For example, in an embodiment, manufacture of a nutritional composition may include the initial steps of combining any dry ingredients with water and/or other required liquids to create a first slurry. The first slurry may be heated to a temperature that is between 170° F. to 200° F. to gelatinize any starch components in the slurry. In an embodiment, the first slurry is heated to a temperature of about 180° F. or 185° F. The first slurry may be heated by any known heating means including direct means (e.g., steam injection) and/or indirect means (e.g., hot water jacket). In an embodiment, the first slurry is heated by direct steam injection.

Since product containers cannot be filled at the heating temperature, the compositions should be cooled prior to packaging to an acceptable temperature, which may range from about 50° F. to about 100° F. In an embodiment, the target cooling temperature is about 70° F. To achieve this initial cooling, ice, cold water, and/or frozen particulates may be added to the heated composition. The frozen particulates may include, for example, frozen fruits, vegetables, pasta, meat, etc. Once the composition has achieved the target cooling temperature, a second slurry of ice, cold water and a source of KCl may be added to the composition and mixed thoroughly. By adding the second KCl slurry at the end of the batching process, the flavor perception of a low-sodium, KCl-containing nutritional composition is improved. To achieve the improved flavor perception, the second KCl slurry must have a temperature that is colder than the cooled batch to which the second KCl slurry is added. In an embodiment, the KCl slurry may have a temperature that is less than or equal to 32° F., and may bring the temperature of the first slurry down to a temperature that is between about 50° F. and about 100° F. In an embodiment, the temperature of the first slurry is brought down to about 70° F. after addition of the cold KCl slurry at the end of the batching process.

The KCl may be added during batching in any form that is desired, so long as the KCl is added in, or with, a cold water slurry at the end of the batching process, after an initial direct cooling. For example, KCl may be purchased in a ready-to-use mixture of KCl and natural and/or artificial flavors that are formulated to mask any bitter or metallic flavors of the KCl. An example of such a mixture would be Bonded Mimic that is sold by Wixon, Inc. Alternatively, KCl may be added to the second slurry at the same time as a known flavor masker and water. In this regard, the KCl may not be bought as a ready-to-use mixture of the KCl and a flavor masker, or the KCl and the flavor masker may be purchased separately and added separately with the flavor masker added in the first slurry and the KCl added in the second slurry.

One example of a known flavor masker is SaltTrim®, a flavor modifier for balancing salt and other flavor characteristics affected by sodium reduction. SaltTrim® is sold by Wild Flavors, Inc., and is designed to be used in conjunction with a separate amount of KCl. The KCl may also be added in any known amounts for use in reduced sodium and targeted sodium level compositions. In an embodiment, the KCl is included in an amount equal to its saturation point in a base liquid, or in an amount that is supersaturated.

In an embodiment, the source of KCl is included in the nutritional composition in an amount from about 0.1% to about 1.0% by weight of the nutritional composition, or 0.2% to about 0.5%, or 0.3% to about 0.4%. The source of KCl may be a ready-to-use mixture of KCl and at least one flavorant. The flavorant may be a taste masking flavorant, as discussed above.

Using the methods of the present disclosure, Applicant has been able to achieve parity with higher-sodium compositions in recipes that require rapid cooling using added ice. The foregoing may be better understood by reference to the following examples, which are presented for purposes of illustration and are not intended to limit the scope of the present disclosure.

EXAMPLES

The following examples describe experiments and consumer tests that were performed by Applicant with respect to the lower-sodium nutritional compositions and methods of making lower-sodium nutritional compositions disclosed in the present disclosure. The goal of the present nutritional compositions and methods of making same is to achieve the targeted level of sodium in meal products for young children to the 200 mg/100 g Codex Alimentarius ("CODEX") target. In Examples 1 and 2, two sodium replacement systems were actively evaluated and optimized in order to reduce sodium content yet maintain flavor.

Several rounds of bench work led to pilot plant scale-up with success when tested with consumers. However, although success has been achieved with scale for certain meal products for young children, in particular those meals requiring indirect methods of cooling, success has not been achieved for other meal prototypes for young children. It has been noted that the prototypes tend to have a thinner consistency when scaled, loss of inherent sweetness, and a bitter/metallic aftertaste as compared with bench prototypes. With the formulas being the same for bench and scaled products, the major differences were the methods of heating and cooling.

Example 1

Effects of Heating

Two, twenty-pound batches of a chicken and pasta sauce with the addition of 0.1% commercially available sweetness enhancer, and 0.25% commercially available potassium chloride mixture were prepared, as this formula was used in the pilot scale trial.

In the first batch, 100% of the water was added in the formula and heated with a jacketed kettle to 150° F., then the pasta was added, and the mixture was heated to 185° F. The mixture was cooled at ambient conditions.

The second batch added 70% of the water in the formula and heated the formula with direct steam injection to 150° F. The pasta was then added, and the mixture was heated to 185° F. The amount of condensate taken in by the batch was calculated and the remaining water was added as ice. Samples were taken out of the second batch at 160° F., 170° F., and 180° F. Ice was added to each sample to cool.

Steam jacketed heating was employed with the first batch of Example 1 since this is the method that most resembles bench work. This is also the method that has lead to success with other toddler meals. However, steam injections with the addition of ice (used with the second batch of Example 1) is the method used to heat and cool some products at pilot and production scale. Results in Table 5 show that the product was thickest when heated in the jacket. At 160° F., and with the use of direct steam injection, the starch did not gelatinize and, therefore, the sample was extremely thin. At 170° F., and with the use of direct steam injection, the starch began to gelatinize and continued to become thicker at 181° F. Applicant saw a slight thinning at 185° F., which may have been due to the difference in sample size. For the 160-181° F. samples, approximately 300 g were removed for sampling. The 185° F. sample was about twenty pounds.

TABLE 5

| | Bostwick (cm) - Experiment 1 | |
|---|---|---|
| Method of Heating | Temperature (° F.) at Bostwick Reading | Bostwick Results (cm) |
| Steam Jacket | 73 | 3.5 |
| Steam injection - 160° F. sample | 72.8 | 24 |
| Steam injection - 170° F. sample | 70.8 | 6.5 |
| Steam injection - 181° F. sample | 71.3 | 5.75 |
| Steam injection - 185° F. sample | 72 | 7 |

The products were also evaluated for flavor. When panelists tasted the steam injection samples, the product tended to taste better with increasing heat, although the steam jacket sample was the preferred sample.

Conclusions

Heating the product to the final gelatinization temperature allowed the product to taste better and therefore, it doesn't appear that the direct steam injection directly harms the flavor of the product. However, the steam injection product was thinner and not as well liked as the steam jacketed product. Therefore, Applicant believes that the method of cooling, not heating, affects the consistency and flavor of the sauce.

Example 2

Effect of Cooling

Five, ten-pound batches of the same chicken and pasta sauce in Example 1 were prepared, with the same amount of 0.1% commercially available sweetness enhancer, and 0.25% commercially available potassium chloride blend, as this formula was used in the pilot scale trial.

In the first batch, 100% of the water was added in the formula and heated in a cooking pot to 150° F. The pasta was added and the mixture was heated to 185° F. The mixture was cooled in an ice water bath.

In the second through fifth batches, 70% of the water was added in the formula and the mixtures were heated in a cooking pot to 150° F. The pasta was added to the mixtures and the mixtures were heated to 185° F. After heating, the remaining 30% of water was added and the mixtures were cooled using one of the following methods.

Second batch—Cold water was added and the mixture was cooled on a counter top.

Third batch—Cold water was added and the mixture was cooled in an ice bath.

Fourth batch—Ice was added and the mixture was cooled on a counter top.

Fifth batch—Ice was added and the mixture was cooled in an ice bath.

The results tabulated in Table 6 show that cooling rapidly (e.g., cold water added at end of cooking and then placing in ice bath; ice added at end of cooking and cooling at ambient conditions; ice added at end of cooking and then placing in ice bath) results in a thinner product than the products that were cooled more slowly.

TABLE 6

Bostwick (cm) - Experiment 2

| Method of cooling | Temperature (° F.) at Bostwick Reading | Bostwick Results (cm) |
|---|---|---|
| No water added at end of cook - ice water bath | 73.9 | 5 |
| Cold water added - ambient | 75 | 5.5 |
| Cold water added - ice water bath | 73.3 | 7.75 |
| Ice added - ambient | 74 | 7 |
| Ice added - ice water bath | 69.3 | 7.5 |

The effect of cooling on flavor was also apparent. Subjectively, the prototypes with cold water added had a much more bitter flavor than prototypes with ice added. The ice-added prototypes also had a bitter flavor, just to a lesser extent.

Conclusions

Applicant has, thus, surprisingly found that the method and rate of cooling affect the prototype flavor and consistency. In order to best simulate scaled-up products, bench samples can be made with 30% of the water removed and added back as ice, along with frozen particulates (e.g., vegetables, pasta, etc.). Although it is not clear why the method of cooling affects the flavor and consistency of certain toddler food prototypes, and without being bound by any theory, Applicant believes that additional water mixed in with the prototype upon cooling is unable to incorporate into the starch gel, which results not only in a thinner product, but also allows for differences in the release of flavor imparted by KCl.

Example 3

Example 3 demonstrates the results of a comparison of the addition of a KCl source (i) at the beginning of the batch process and (ii) at the end of the batch process.

Methods

A chicken and pasta toddler meal was prepared by either (i) adding a commercially available KCl mixture or KCl in the slurry, heating to gelatinization and then cooling with frozen particulates (e.g., add KCl at the beginning of the batch); or (ii) by adding a commercially available KCl mixture or KCl in a very cold water slurry at the end of batching. For example, in option (i), dry ingredients (e.g., starch and KCl) were slurried in water prior to heating and then heated via steam injection to 185° F., after which ice and frozen particulates were added to the slurry to cool the slurry. In option (ii), for example, all dry ingredients were slurried (except for the commercially available KCl mixture and/or KCl), the slurry was then heated via direct steam injection to 185° F., after which ice, frozen particulates and an ice water slurry containing KCl were added.

The sodium and potassium content was measured by inductively coupled plasma mass spectrometry ("ICP-MS") of each individual component pre- and post-retort. The data was converted using the following calculations:

Pre-Retort Ingredients:

(mg/100 g of ingredient*formula %)/SUM of mg K of all formula ingredients=% K of each ingredient in the formula.

Post-Retort Ingredients:

Same formula as above, change in spatial arrangement K=pre-retort % K−post-retort % K.

Results

Table 7 shows both the sodium and the potassium contents of the raw particulates of the composition tested.

TABLE 7

| | mg/100 g in ingredient | |
|---|---|---|
| | Na | K |
| Carrots | 25.92 | 190.8 |
| Peas | 0.99 | 206.1 |
| Chicken | 575.1 | 210.4 |
| Celery | 10.41 | 297.1 |
| Corn | 1.34 | 251.1 |
| Pasta | 45.1 | 226.9 |

As is shown in Table 7, the chicken and sauce components contain the most sodium in all systems and therefore, after retorting, these components lose sodium while the vegetables and pasta pick up sodium during the retort process. It is believed that this transfer of sodium is due to simple diffusion, as is illustrated in FIG. 1. In FIG. 1, the control bar is the left-most bar of each measured component (i.e., carrots, peas, chicken, celery, corn, sauce and pasta), while the right-most bar represents KCl added at the end of the batching process separately, but in conjunction with, a commercially available taste modifier (represented by "Wild"). "Wixon" represents a ready-to-use mixture of KCl with natural and/or artificial taste modifiers. As shown, FIG. 1 illustrates that the chicken and sauce components lose sodium during retorting, while the vegetables and pasta pick up sodium.

Figure 2:
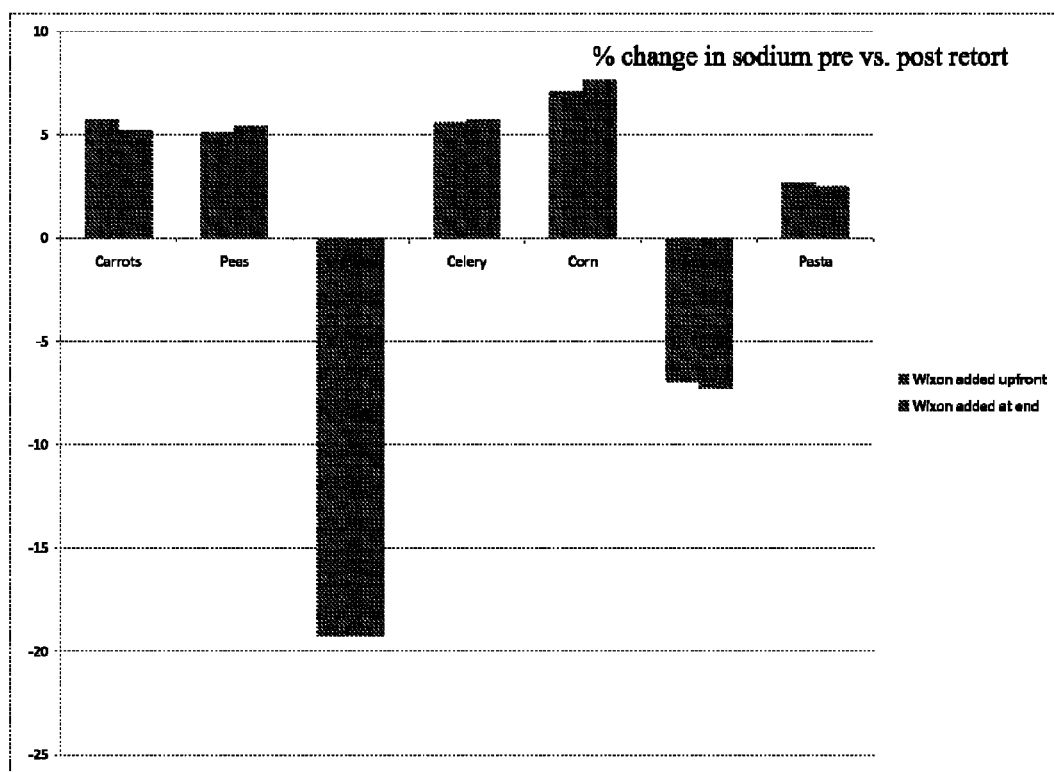
FIG. 2 illustrates a percentage change in sodium distribution of a composition prior to and after retorting in accordance with an embodiment of the present disclosure.
Figure 3:
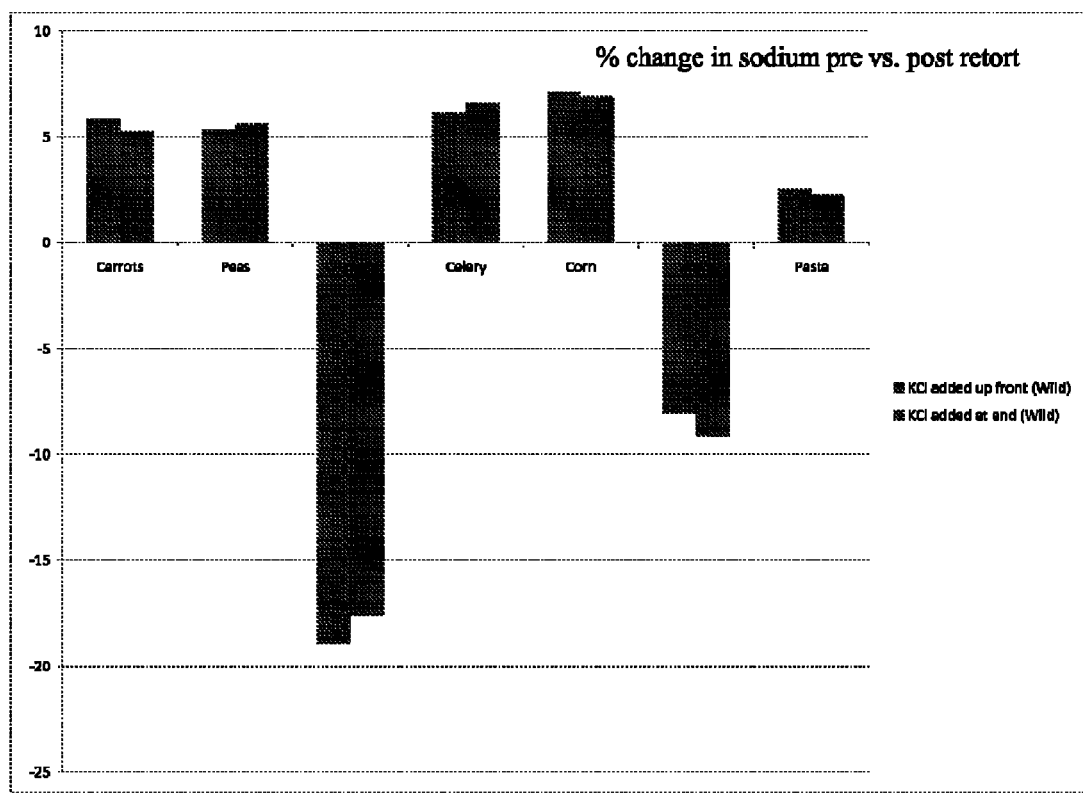
FIG. 3 illustrates a percentage change in sodium distribution of a composition prior to and after retorting in accordance with an embodiment of the present disclosure.

FIGS. 2 and 3 also show that the order of addition of KCl does not affect the distribution in sodium attributed to diffusion. For example, FIG. 2 shows the results obtained by adding a commercially available KCl blend (e.g., "Wixon") at the beginning of the batching process (e.g., in accordance with method (i)), and adding a commercially available KCl blend (e.g., "Wixon") at the end of the batching process (e.g., in accordance with method (ii)). Similarly, FIG. 3 shows the results obtained by adding KCl and a taste modifier separately, but at the same time, at the beginning of the batching process (e.g., in accordance with method (i)), and at the end of the batching process (e.g., in accordance with method (ii)).

Figure 4:
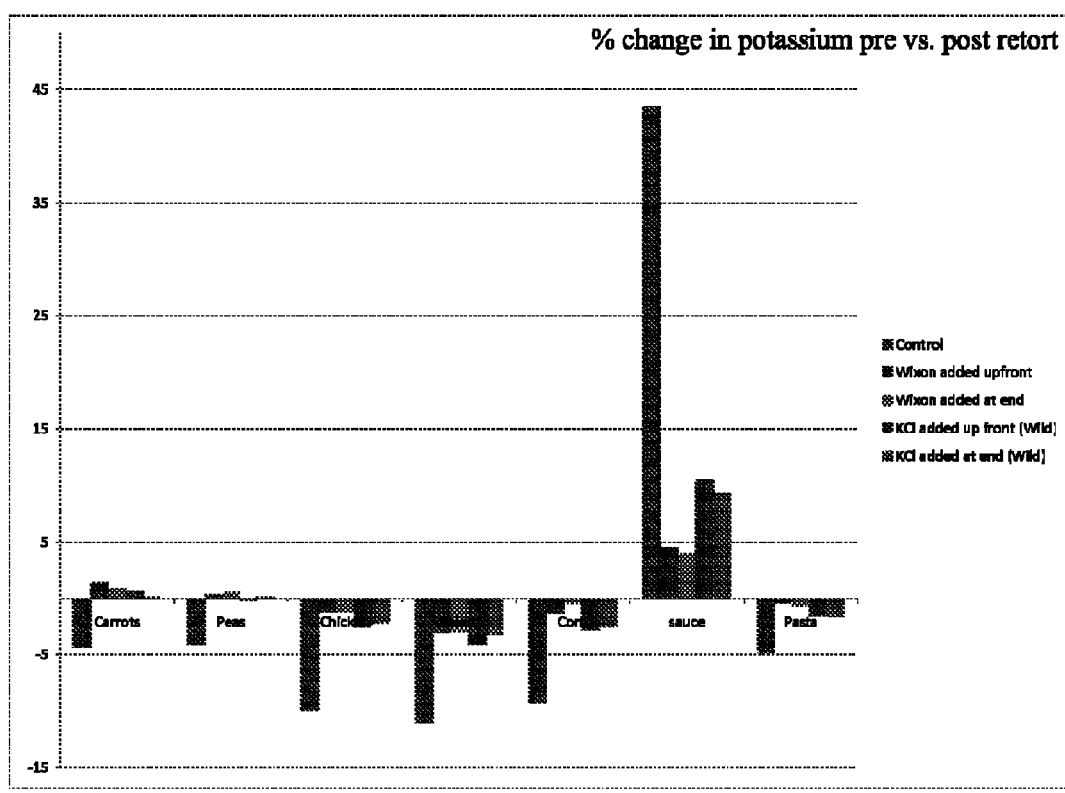
FIG. 4 illustrates a percentage change in potassium distribution of a composition prior to and after retorting in accordance with an embodiment of the present disclosure.
Figure 5:
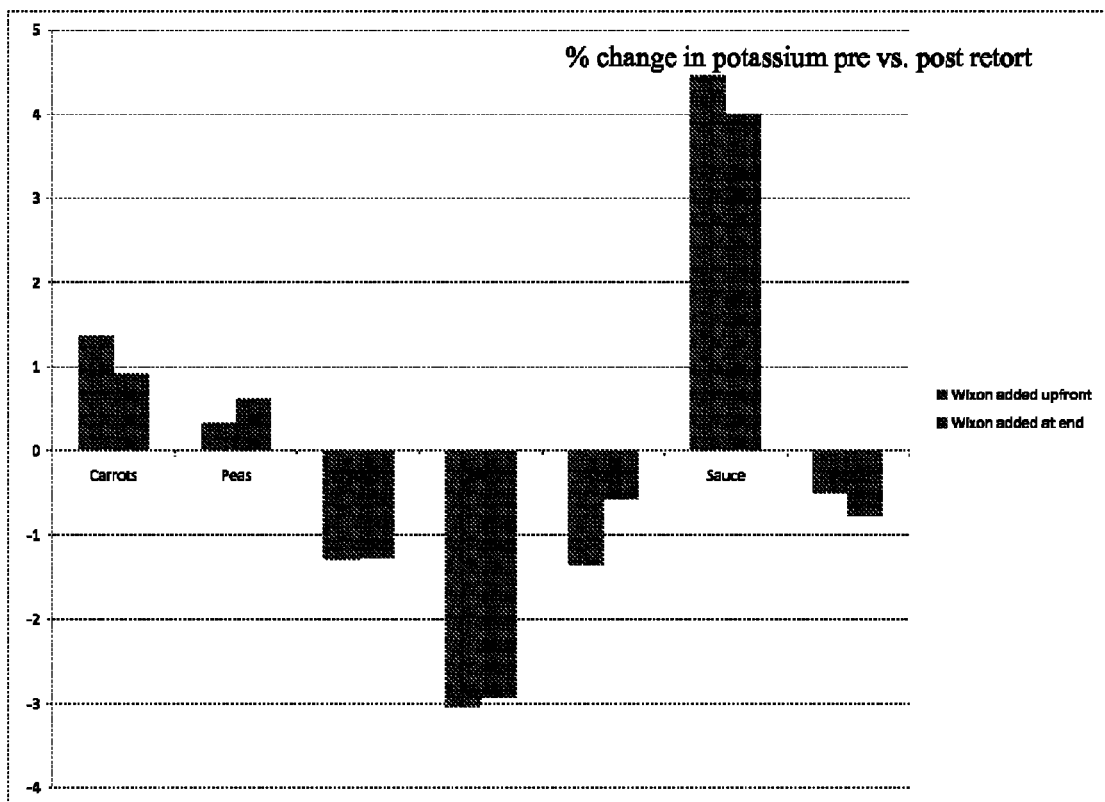
FIG. 5 illustrates a percentage change in potassium distribution of a composition prior to and after retorting in accordance with an embodiment of the present disclosure.
Figure 6:
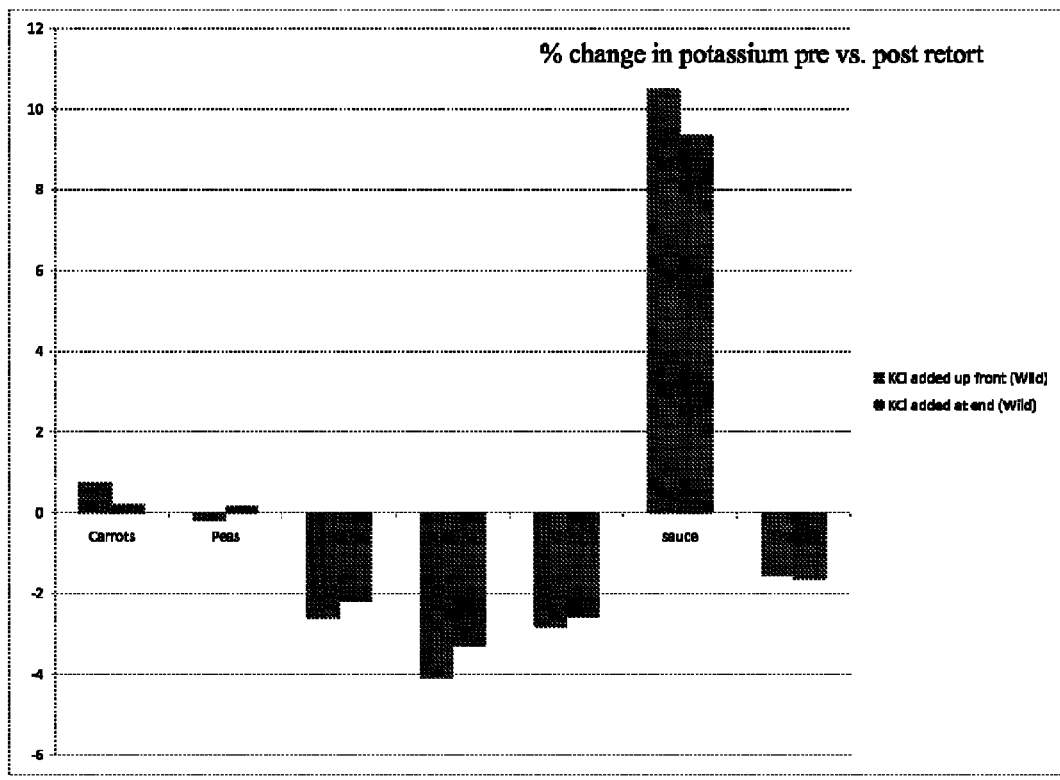
FIG. 6 illustrates a percentage change in potassium distribution of a composition prior to and after retorting in accordance with an embodiment of the present disclosure.

In contrast to the sodium content described above, the vegetables, chicken, and pasta have a significant amount of potassium, as is also shown in Table 7. However, as with sodium, it appears that simple diffusion accounts for much of the potassium migration out of the particulates and into the sauce. See, e.g., FIG. 4. Additionally, FIGS. 5 and 6 show that the order of addition of KCl may slightly affect the potassium migration between particles and sauce.

Although diffusion largely accounts for sodium and potassium migration between sauce and particles, there is an apparent difference in flavor perception when the potassium is added upfront versus the end of batching. It is thought that these differences may be due to the spatial arrangement of potassium in the sauce itself. Specifically, it is believed that the spatial arrangement of how the potassium is associated with free v. bound water in the starch gel may account for the differences in flavor perception.

Example 4

Example 4 shows the results from a comparison of consumer testing results for nutritional compositions prepared by the addition of a KCl source (i) at the beginning of the batch process and (ii) at the end of the batch process.

A discrimination panel session was facilitated by Applicant to explore possible ways to screen prototypes prior to fielding consumer research. The goal of the panel session was to determine if the panelists were able to identify the presence of off-notes and thereby screen out prototypes that would possibly "fail" with consumers. Thus, the goal of the session was to assess the potential of using the Delta Panel for screening prototypes. If significantly higher amount of panelists select any guardrail attributes (e.g., bitter, metallic, etc.) for either of the prototypes versus the current formulation ("control"), then this validates the use of Delta Panels for screening.

In this Example, three products were tested, which included a toddler food having chicken, vegetables and pasta. The "control" formulation was a known chicken, vegetable, and pasta formulation. The "V2" and "V3" compositions were the same as the control, but also included flavoring additives such as salt, pepper, savory flavor, etc., water, ice and a commercially available KCl blend. The V2 and V3 compositions were the same composition, but were manufactured by different methods. The V2 composition was manufactured according to a process wherein the commercially available KCl blend was added at the beginning of the batching process, prior to heating. For example, chicken fat and celery were heated to about 180° F. in a kettle. Dry ingredients including starches, flavors and Bonded Mimic were added to a blender with 50% of the formula water to form a slurry. The slurry was added to the kettle along with 40% of the formula water and onion. The slurry was heated and at 150° F. the dry pasta was added. The slurry continued heating until 185° F. Diced chicken, diced vegetables and ice (remaining 10% of the formula water) were added to the slurry, which was cooled to about 70° F.

The V3 composition was manufactured according to a process of the present disclosure wherein the commercially available KCl blend was added to a slurry of ice and water at the end of the batching process and after initial cooling. Specifically, chicken fat and celery were heated to about 180° F. Dry ingredients including starches and flavors were added to a blender with 50% of the formula water to form a slurry. The slurry was added to a kettle along with 40% of the formula water and onion. The slurry was heated and at 150° F. the dry pasta was added. The slurry continued heating until 185° F. Diced chicken, vegetables and ice were added to the slurry, which was cooled to about 70° F. A second slurry of ice, cold water and a commercially available KCl blend was then added to further cool the mixture. The second slurry had a temperature that was below freezing while the batch temperature was around 70° F.

The consumer panelists were each asked the same question: Based on the sample you just evaluated, please indicate which words or phrases below you associate with the sample, check all that apply:

Fresh
Soft Ingredients
Thick sauce
Burn
Tasty
Chewy
Bitter
Good Blend of Meat, Pasta and Vegetables
Flavorful
Yummy
Unappetizing
Savory
Sweet
Salty
Peppery
High Quality
Metallic
Good for Toddlers
Other (please specify)
None of the above The results of the panel session "Choose All That Apply" questionnaire are included at Table 8.

TABLE 8

"Choose All That Apply" Tabled Results

| Word/Phrase | Control a | V2 b | V3 c |
|---|---|---|---|
| Fresh | 40% | 29% | 27% |
| Soft Ingredients | 71% | 75% | 71% |
| Thick Sauce | 67% | 73% | 67% |
| Burn | 0% | 2% | 2% |
| Tasty | 53% | 24% | 33% |
| Chewy | 13% | 18% | 18% |
| Bitter | 0% | 6% | 11% |
| Good Blend of Meat, Pasta and Veggies | 76% | 69% | 64% |
| Bland | 18% | 29% | 29% |
| Flavorful | 51% | 31% | 36% |
| Yummy | 18% | 11% | 16% |
| Unappetizing | 4% | 13% | 7% |
| Savory | 22% | 20% | 22% |
| Sweet | 0% | 4% | 4% |
| Salty | 7% | 2% | 4% |
| Peppery | 0% | 6% | 2% |
| High Quality | 27% | 20% | 16% |
| Metallic | 0% | 2% | 6% |
| Good for Toddlers | 82% | 69% | 73% |
| Other | 4% | 7% | 6% |
| None of the Above | 0% | 0% | 0% |

As is illustrated by Table 8, significant differences were found for two descriptors "tasty" and "flavorful," where there were significant differences between the control over V2. With respect to the descriptor "unappetizing," there were significant differences between V2 over the control.

Example 5

As discussed in detail above, there is significant interest in lowering the overall level of sodium in certain meal options for young children. One such meal manufactured by Applicant contains a white turkey stew that has a sodium content of about 275 mg/100 g. Applicant desired to achieve sodium levels in the toddler meal that are closer to the 200 mg/100 g CODEX target.

Applicant performed a consumer test to determine consumer acceptance of two lower-sodium prototypes of a white turkey stew with rice relative to the white turkey stew that has a sodium content of about 275 mg/100 g. Thus, the goal of the consumer testing was to determine the overall liking of the lower-sodium prototypes versus the current toddler meal offering. The consumer testing results were based on child and adult hedonic ratings, and were required to be at parity or better than the current white turkey stew that has a sodium content of about 275 mg/100 g.

The "control" product was a white turkey stew with rice having 275 mg/100 g sodium. The lower-sodium prototypes had the same composition as the control, but with slightly less amounts of salt and with an added commercially available KCl blend. The first lower-sodium prototype ("V2") was a white turkey stew with rice, 0.32% commercially available KCl blend by weight, and a sodium content of 200 mg/100 g. The second lower-sodium prototype ("V3") was a white turkey stew with rice, 0.34% commercially available KCl blend by weight, and a sodium content of 200 mg/100 g. As such, V2 and V3 had the same compositions, except for the amount of commercially available KCl blend. The products were prepared by adding starch, salt, a commercially available KCl blend, and onion into a blender with 50% of the formula water. Tomato paste and chicken fat were added to a blender with 25% of the formula water to form a slurry. The slurry was added to a kettle and heated to about 185° F. Rice was then added and the temperature was held for three minutes before turkey and other vegetables were added. The slurry was allowed to cool to a target temperature (e.g., about 70° F.).

For the consumer testing, panelists received approximately two ounces of warmed product (warmed for 30 s in a microwave), in a 3.25 oz. plastic soufflé cup with lid. There were approximately two servings per tub.

105 parents and their 12-24 month old children completed this consumer survey. Of the children tested, 58% were males and 42% were females. Ages of children for whom the parents were making the product judgments were:

| Age (mos.) | | | | | | | | | | | | | |
| --- | --- | --- | --- | --- | --- | --- | --- | --- | --- | --- | --- | --- | --- |
| | 12 | 13 | 14 | 15 | 16 | 17 | 18 | 19 | 20 | 21 | 22 | 23 | 24 |
| % | 5% | 7% | 7% | 4% | 8% | 7% | 16% | 2% | 3% | 9% | 7% | 3% | 22% |

During the test, panelists were asked to opine on a series of sequential monadic questions and determine product merit without knowledge of any product brand. Panelists received (at random) three products per person and samples were presented monodically. The sequential monadic questions were as follows:
  Developmental Stage Based on Feeding Plan
  Appearance-Liking (9-point scale)
  Meets Expectations-Base on Appearance (5-point scale)
  Child-Liking (9-point scale)
  Adult-Liking (9-point scale)
  Flavor-Liking (9-point scale)
  Texture-Liking (9-point scale)
  Sauce-Liking (9-point scale)
  Sauce-Flavor-Liking (9-point scale)
  Sauce-Directionals for saltiness, consistency and amount (5-point JAR scale)
  Meat-Liking (9-point scale)
  Meat-Directionals for amount (5-point JAR scale)
  Rice-Liking (9-point scale)
  Rice-Directionals for texture and amount (5-point JAR scale)
  Vegetables-Liking (9-point scale)
  Vegetables-Directionals for texture and amount (5-point JAR scale)
  Was there an aftertaste (yes/no)
  Type of aftertaste (5-point scale)
  Met Expectations (5-point scale)
  Purchase Intent (5-point scale) with forced comments
  Open End Comments
  Ranking Results When looking at the ranking scores, the control form a was directionally preferred. There also appears to be some confusion by consumers with their perception of saltiness in the prototype. Additionally, the V2 prototype did not fair as well as the control as ranked by respondents.

Example 6

Example 5 employed the traditional method of batching whereas the KCL within the commercially available KCl blend ("Wixon") was added at the beginning of batching. In contrast, Example 6 employed the method of adding the commercially available KCl blend at the end of batching in an ice cold water slurry.

The "control" product of Example 6 was a white turkey stew with rice having 275 mg/100 g sodium. The lower-sodium prototypes had the same composition as the control, but with slightly less amounts of salt and with an added commercially available KCl blend ("Wixon"). The first lower-sodium prototype ("V2") was a white turkey stew with rice, 0.25% commercially available KCl blend by weight, 0.5% sugar, and a sodium content of 200 mg/100 g. The second lower-sodium prototype ("V3") was a white turkey stew with rice, 0.25% commercially available KCl blend by weight, and a sodium content of 200 mg/100 g. As such, V2 and V3 had the same composition, except for the added sugar in V2. The products were prepared by adding starch, salt and onion into a blender with 50% of the formula water. Tomato paste and chicken fat were added to a blender with 25% of the formula water to form a slurry. The slurry was added to a kettle and heated to about 185° F. Rice was then added and the temperature was held for three minutes before turkey and other vegetables were added. The slurry was allowed to cool to a target temperature (e.g., about 70° F.) before a second slurry of ice, cold water and commercially available KCl blend was added.

Panelists received approximately two ounces of warmed product (warmed for 30 s in a microwave), in a 3.25 ounce plastic soufflé cup with lid. There were approximately two servings per tub.

120 parents and their 12-24 month old children completed this consumer survey. Of the children tested, 53% were males and 47% were females. Ages of children for whom the parents were making the product judgments were:

| Age (mos.) | | | | | | | | | | | | | |
| --- | --- | --- | --- | --- | --- | --- | --- | --- | --- | --- | --- | --- | --- |
| 12 | 13 | 14 | 15 | 16 | 17 | 18 | 19 | 20 | 21 | 22 | 23 | 24 | |
| 3% | 7% | 13% | 7% | 9% | 8% | 6% | 7% | 9% | 6% | 8% | 7% | 10% | |

During the test, panelists were asked to opine on a series of sequential monadic questions and determined product merit without knowledge of any product brand. The panelists also received (at random) three products per person and samples were presented monodically. The sequential monadic questions were as follows:
  Developmental Stage Based on Feeding Plan
  Appearance-Liking (9-point scale)
  Meets Expectations-Base on Appearance (5-point scale)
  Child-Liking (9-point scale)
  Adult-Liking (9-point scale)
  Flavor-Liking (9-point scale)
  Texture-Liking (9-point scale)
  Sauce-Liking (9-point scale)

Sauce-Flavor-Liking (9-point scale)
Sauce-Directionals for saltiness, consistency and amount (5-point JAR scale)
Meat-Liking (9-point scale)
Meat-Directionals for amount (5-point JAR scale)
Rice-Liking (9-point scale)
Rice-Directionals for texture and amount (5-point JAR scale)
Vegetables-Liking (9-point scale)
Vegetables-Directionals for texture and amount (5-point JAR scale)
Was there an aftertaste (yes/no)
Type of aftertaste (5-point scale)
Met Expectations (5-point scale)
Purchase Intent (5-point scale) with forced comments
Open End Comments
Ranking
Results Both of the lower-sodium prototypes performed at parity with the control. Therefore success was achieved at a much lower amount of the KCl blend when compared with Example 5 by modifying the batching procedures (e.g., compare Example 5 and Example 6). This demonstrates the effects of order addition on flavor perception, in particular salty perception that is most likely due to the difference in free versus bound water within the starch gel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed as follows:

1. A method for producing a low sodium nutritional composition formulated for a young child up to about four years of age, wherein the nutritional composition has less than or equal to about 200 mg sodium per 100 g of nutritional composition, the method comprising the steps of:
preparing a first slurry, wherein the first slurry comprises water and one or more dry ingredients, wherein the dry ingredients include at least one food component selected from the group consisting of meat, beans, milk, cheese, yogurt, grains, pasta, fruit, vegetables, and combinations thereof;
heating the first slurry to a first predetermined temperature in a range of from about 170° F. to about 200° F.;
cooling the first slurry to a second predetermined temperature in a range of from about 50° F. to 100° F.;
adding a second slurry to the first slurry to form a nutritional composition, wherein the second slurry comprises at least cold water and a source of potassium chloride, wherein the source of potassium chloride is present in the second slurry in an amount greater than or equal to about 22 g per 100 g of slurry, wherein the second slurry has a temperature of less than or equal to about 32° F. at the time that it is added to the first slurry, and wherein the source of potassium chloride is present in an amount from about 0.1% to about 1.0% by weight of the nutritional composition; and
packaging the nutritional composition.

2. The method according to claim 1, wherein the first predetermined temperature is about 180° F.

3. The method according to claim 1, wherein the heating is accomplished by direct steam injection.

4. The method according to claim 1, wherein the second predetermined temperature is about 70° F.

5. The method according to claim 1, wherein the cooling is accomplished by a step selected from the group consisting of adding frozen particulates to the first slurry, adding ice to the first slurry, exposing the heated slurry to ambient temperature, and combinations thereof.

6. The method according to claim 1, wherein the source of potassium chloride is a ready-to-use mixture of potassium chloride and at least one taste masking flavorant.

7. The method according to claim 6, wherein the at least one taste masking flavorant masks the flavor of potassium chloride.

8. The method according to claim 1, further comprising the step of mixing the first slurry with the second slurry to achieve a third predetermined temperature.

9. The method according to claim 8, wherein the third predetermined temperature is from about 50° F. to about 100° F.

10. The method of claim 1, wherein the first slurry contains sodium.

11. The method of claim 1, wherein the first slurry contains no added sodium.

* * * * *